US012568950B2

(12) United States Patent
Hardy

(10) Patent No.: US 12,568,950 B2
(45) Date of Patent: Mar. 10, 2026

(54) RODENT GASSER WITH SELF-IGNITION SYSTEM AND METHOD OF USING THE SAME

(71) Applicant: WOODSTREAM CORPORATION, Lititz, PA (US)

(72) Inventor: Brent David Hardy, Lancaster, PA (US)

(73) Assignee: Woodstream Corporation, Lancaster, PA (US)

( * ) Notice: Subject to any disclaimer, the term of this patent is extended or adjusted under 35 U.S.C. 154(b) by 980 days.

(21) Appl. No.: 15/780,441

(22) PCT Filed: Mar. 26, 2018

(86) PCT No.: PCT/US2018/024359
§ 371 (c)(1),
(2) Date: May 31, 2018

(87) PCT Pub. No.: WO2018/183200
PCT Pub. Date: Oct. 4, 2018

(65) Prior Publication Data
US 2021/0169062 A1 Jun. 10, 2021

Related U.S. Application Data

(60) Provisional application No. 62/539,146, filed on Jul. 31, 2017, provisional application No. 62/477,492, filed on Mar. 28, 2017.

(51) Int. Cl.
*A01M 13/00* (2006.01)
*A01M 25/00* (2006.01)
*A01N 25/20* (2006.01)

(52) U.S. Cl.
CPC ........ *A01M 13/006* (2013.01); *A01M 25/006* (2013.01); *A01N 25/20* (2013.01)

(58) Field of Classification Search
CPC .. A01M 13/00; A01M 13/006; A01M 17/002; A01M 17/004; A01M 25/006

(Continued)

(56) References Cited

U.S. PATENT DOCUMENTS

| 1,262,649 | A | * | 4/1918 | Darragh | .............. | A01M 1/2066 |
| | | | | | | 43/127 |
| 1,443,464 | A | * | 1/1923 | Fouke | ................... | A01M 13/00 |
| | | | | | | 43/127 |

(Continued)

FOREIGN PATENT DOCUMENTS

| CN | 201311234 | | 9/2009 |
| CN | 101638350 | * | 2/2010 |

(Continued)

OTHER PUBLICATIONS

Canadian Patent Office Examination Search Report, dated Nov. 22, 2023, Application No. 3,057,847, 5 pages.

*Primary Examiner* — David J Parsley
(74) *Attorney, Agent, or Firm* — Barley Snyder

(57) ABSTRACT

A rodent gasser including a smoke cartridge and having a self ignition system is provided. According to a first embodiment, the self ignition system has a top plastic cap covering a strike pad and a lower plastic shroud that protects the rodent gasser ignition system prior to use. An ignition button is provided under the shroud that works with the strike pad to ignite the smoke cartridge. According to a second embodiment, the self ignition system has a top plastic cap covering activation components of a pull pin ignition system that include a gripping element and a connecting element that couples the gripping element to an internal ignition assembly. The gasser is ignited by pulling the gripping element. A method of using the rodent gasser is also provided.

16 Claims, 5 Drawing Sheets

(58) Field of Classification Search
USPC .............. 44/507; 131/185; 43/124, 127, 131
See application file for complete search history.

(56) References Cited

U.S. PATENT DOCUMENTS

| 1,646,767 | A | * | 10/1927 | Schille ................ A01M 17/004 |
| | | | | 43/124 |
| 1,727,457 | A | * | 9/1929 | van Meter ........... A01M 19/00 |
| | | | | 43/127 |
| 1,759,033 | A | * | 5/1930 | Beck ................... A01M 17/004 |
| | | | | 43/125 |
| 1,856,062 | A | * | 4/1932 | Houghton ........... A01M 13/003 |
| | | | | 422/29 |
| 2,720,012 | A | * | 10/1955 | Lilly ......................... C06D 3/00 |
| | | | | 43/127 |
| 3,530,795 | A | * | 9/1970 | Raymond ................. F42B 4/26 |
| | | | | 102/336 |
| 3,648,615 | A | * | 3/1972 | Wilkaitis .................. F42B 4/26 |
| | | | | 102/336 |
| 3,741,121 | A | * | 6/1973 | Miller ..................... F42B 3/117 |
| | | | | 102/336 |
| 3,954,059 | A | * | 5/1976 | Langseth .................. F42B 4/26 |
| | | | | 102/341 |
| 4,397,321 | A | * | 8/1983 | Stuetz ...................... A24D 3/16 |
| | | | | 131/342 |
| 4,512,102 | A | * | 4/1985 | Long ...................... A01M 27/00 |
| | | | | 43/84 |
| 5,313,888 | A | | 5/1994 | Martin |
| 5,917,142 | A | * | 6/1999 | Chang ....................... F42B 4/26 |
| | | | | 102/343 |
| 6,440,362 | B1 | | 8/2002 | Bryant et al. |
| 7,249,437 | B2 | * | 7/2007 | Stout ................... A01M 7/0014 |
| | | | | 43/124 |
| 8,182,622 | B1 | | 5/2012 | Ouart et al. |
| 8,348,539 | B2 | * | 1/2013 | Chu ....................... B43K 29/16 |
| | | | | 44/507 |
| 2003/0036335 | A1 | * | 2/2003 | Juy ......................... F42B 12/46 |
| | | | | 446/181 |
| 2005/0224596 | A1 | | 10/2005 | Panopoulos |
| 2010/0144534 | A1 | * | 6/2010 | Pullen .................... A01N 31/00 |
| | | | | 47/58.1 SC |
| 2011/0078940 | A1 | | 4/2011 | Gauker et al. |
| 2015/0329437 | A1 | * | 11/2015 | Hultman ................ C06B 29/20 |
| | | | | 149/79 |

FOREIGN PATENT DOCUMENTS

| CN | 203928908 | 5/2014 |
| JP | 2000-53483 | 2/2000 |

* cited by examiner

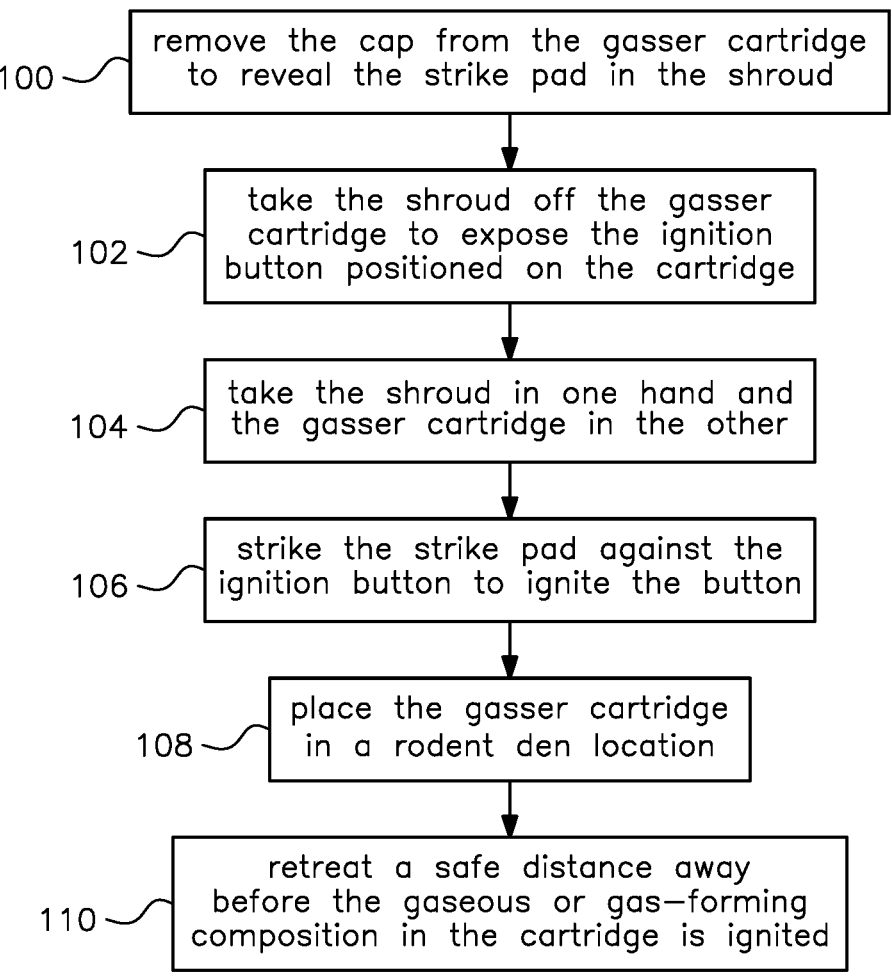

100 — remove the cap from the gasser cartridge to reveal the strike pad in the shroud 102 — take the shroud off the gasser cartridge to expose the ignition button positioned on the cartridge 104 — take the shroud in one hand and the gasser cartridge in the other 106 — strike the strike pad against the ignition button to ignite the button 108 — place the gasser cartridge in a rodent den location 110 — retreat a safe distance away before the gaseous or gas—forming composition in the cartridge is ignited

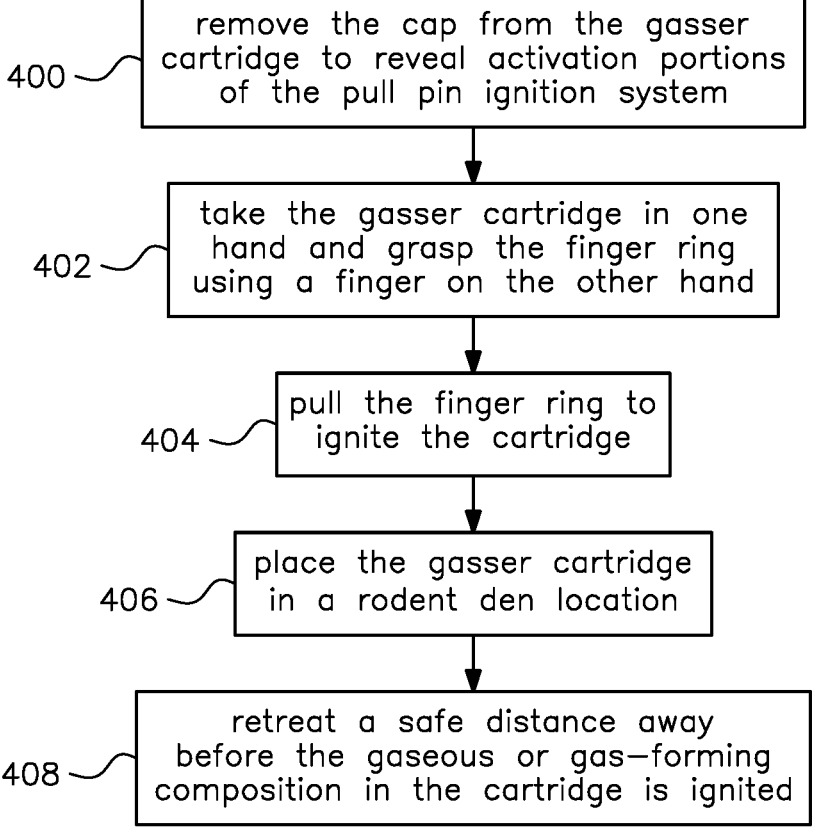

400 — remove the cap from the gasser cartridge to reveal activation portions of the pull pin ignition system 402 — take the gasser cartridge in one hand and grasp the finger ring using a finger on the other hand 404 — pull the finger ring to ignite the cartridge 406 — place the gasser cartridge in a rodent den location 408 — retreat a safe distance away before the gaseous or gas-forming composition in the cartridge is ignited

FIG. 6

RODENT GASSER WITH SELF-IGNITION SYSTEM AND METHOD OF USING THE SAME

This application claims the priority of U.S. Provisional Application Ser. No. 62/477,492 filed Mar. 28, 2017, and also the priority of U.S. Provisional Application Ser. No. 62/539,146 filed Jul. 31, 2017.

BACKGROUND OF THE INVENTION

Field of the Invention

The present invention is related to the field of pest control and, more particularly, to a rodent gasser or smoke cartridge with a self ignition system that eliminates the need for a fuse. As referred to herein, the term "rodent" in intended to include at least gophers, pocket gophers, moles, ground squirrels, rats, skunks and woodchucks, as well as similar rodent-type pests.

Description of the Related Art

Smoke cartridges have traditionally been developed and used for signal and distress flares like those disclosed in U.S. Pat. No. 8,182,622 ("the '622 patent") and are typically ignited using a fuse. U.S. Pat. No. 5,917,142 ("the '142 patent") discloses an ignition system for a flare that relies upon frictional engagement between the head of the flare and a surface on the flare cap. Neither the '622 patent nor the '142 patent contemplate having any applicability to a rodent gasser device or method but, for the teaching that is set forth therein, both the '622 patent and the '142 patent are hereby incorporated by reference as if fully set forth herein in their entireties.

Pull wire igniters like that disclosed in U.S. Pat. No. 5,313,888 ("the '888 patent") have also been used for flares. However, the '888 patent also does not contemplate any applicability to a rodent gasser.

Existing rodent gassers are ignited using a fuse, a method of operation that can have several problems.

First, the length of the fuse determines how long it burns. To keep fuse size reasonable, the burn times are typically 5-10 seconds before the gasser fully ignites the gaseous or gas-forming composition but, by this time, it is dangerous to still be holding onto the fuse. Hence, rodent gassers that are lit by a fuse require caution due to the risk of error in handling and resulting injury.

Second, as fuses are affected by the movement of air, the extended burn time before the gasser fully ignites can be additionally problematic in windy conditions. Also, fuses are affected by moisture which can also compromise their effectiveness.

Third, it is also a common problem for fuses used with gassers to become disconnected or damaged, thus making it impossible to ignite the gaseous or gas-forming composition in the rodent gasser cartridge.

Therefore, a need exists for a rodent gasser with a self ignition system that provides better protection for the consumer and, by not requiring a lighter, is easier to ignite. A need also exists for a rodent gasser that is more robust in both storage and use, and for a method of using a rodent gasser having a self-ignition system.

SUMMARY OF THE INVENTION

In view of the foregoing, the present invention is directed to a rodent gasser having a self-ignition system. The self ignition system has a prime load that can be adjusted and that can provide up to 15-60 seconds of time, and preferably about 30-45 seconds, before the gasser composition fully ignites, thus giving the consumer more time to safely place the gasser in the rodent's burrow and retreat a safe distance away. The ignition system is windproof and water proof, being protected by a plastic shroud built into the gasser itself. The present invention is further directed to a method of using a rodent gasser having a self-ignition system.

Accordingly, it is an object of the present invention to provide a rodent gasser having a self-ignition system that does not require or use a fuse to light the gasser, simplifying operation for the user.

Another object of the present invention is to provide a rodent gasser having a self-ignition system in accordance with the preceding object that is unaffected by wind and/or by moisture and therefore will light with greater reliability.

A further object of the present invention is to provide a rodent gasser having a self-ignition system in accordance with the preceding objects that, as compared with fuse-lit gassers, has a longer burn time, on the order of up to about 60 seconds, before the actual formula in the smoke cartridge is ignited.

Yet another object of the present invention is to provide a rodent gasser having a self-ignition system in accordance with the preceding objects that has a plastic cap and, according to at least one embodiment, a plastic shroud that fully protects the gasser ignition elements when the rodent gasser is not in use.

Still another object of the present invention is to provide a rodent gasser having a self-ignition system in accordance with the preceding objects that is simple to understand and execute for the consumer.

A further object of the present invention is to provide a rodent gasser having a self-ignition system in accordance with the preceding objects that is robust and resistant to tampering and damage from shipping.

Another object of the present invention is to provide a method of using a rodent gasser having a self-ignition system of the type set forth in the preceding objects by which the user removes the cap from the gasser cartridge to reveal an ignition component, ignites the gasser cartridge, places the cartridge in a rodent burrow or other rodent lair and then retreats a safe distance away from the location where the rodent gasser was placed before the gaseous or gas-forming composition in the cartridge ignites to produce a pest fumigating gas or smoke.

Yet another object of the present invention is to provide a rodent gasser having a self-ignition system in accordance with the preceding object in which, according to a first embodiment, the step of igniting the gasser cartridge includes 1) removing the cap to reveal a strike pad in the plastic shroud, 2) further removing the shroud on the gas cartridge by pulling the same straight up to expose an ignition button positioned on the cartridge, and then 3) taking the shroud in one hand and striking the strike pad against the ignition button to ignite the button, igniting the cartridge without a fuse.

A further object of the present invention is to provide a rodent gasser having a self-ignition system in accordance with the object before the preceding object in which, according to a second embodiment, the step of igniting the gasser cartridge includes removing the cap to reveal a gripping element such as a finger ring attached to a connecting element which is coupled to an ignition system integrated within the gasser, the user igniting the gasser cartridge by pulling the gripping element to release or activate an igniting element such as a firing pin structure within the gasser.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a flow chart of the method steps undertaken when using the rodent gasser as shown in FIGS. 1 and 2.

FIG. 6 is a flow chart of the method steps undertaken when using the rodent gasser as shown in FIGS. 4, 4A and 5.

DETAILED DESCRIPTION OF THE PREFERRED EMBODIMENTS

Figure 1:
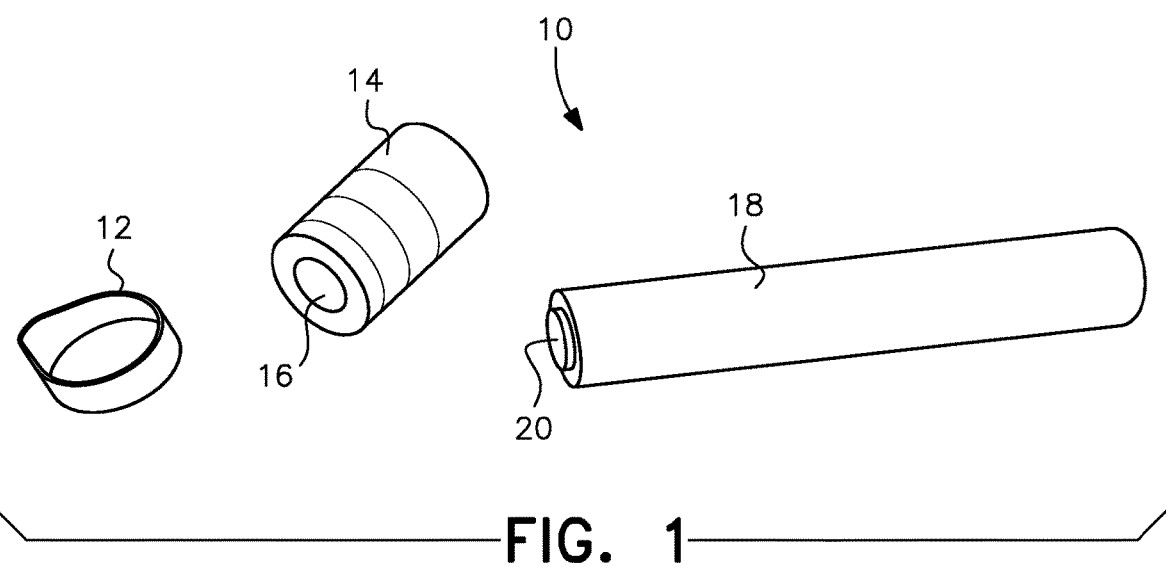
FIG. 1 is an exploded photographic view of the components of a rodent gasser in accordance with a first embodiment of the present invention.

It is to be understood that the embodiments described herein are disclosed by way of illustration only. It is not intended that the invention be limited in its scope to the details of construction and arrangement of components set forth in the following description or illustrated in the drawings. Also, in describing the preferred embodiments, specific terminology will be resorted to for the sake of clarity. It is to be understood that each specific term includes all technical equivalents which operate in a similar manner to accomplish a similar purpose.

Figure 2:
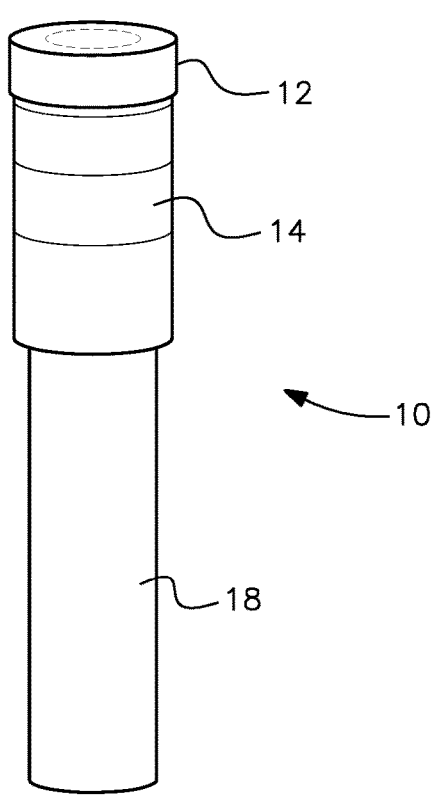
FIG. 2 is a photograph showing an assembled view of the rodent gasser components shown in FIG. 1.

According to a first embodiment as shown in the exploded view of FIG. 1 and the assembled view of FIG. 2, the present invention is directed to a rodent gasser generally designated by reference numeral 10. The rodent gasser 10 includes a top plastic cap 12, a lower plastic shroud 14 with a strike pad 16, and a gasser cartridge 18, which is preferably wrapped in paper, having an ignition button 20.

When assembled, the plastic cap 12 covers the strike pad 16 and the ignition button is positioned under the lower shroud 14. When the cap 12 is removed from the gasser cartridge 18, the strike pad 16 is exposed. The strike pad 16 is preferably made out of a material similar to that of a match strike pad.

The present invention is also directed to a method of using a rodent gasser having an ignition system of the type described herein. Hence, in use according to the first embodiment, the consumer removes the cap 12, exposing the strike pad 16, and then removes the lower plastic shroud 14 by pulling it straight up and away from the cartridge 18. To help prevent tampering, the lower shroud is made so that it takes a reasonable amount of force to remove it from its position on the cartridge 18.

With the strike pad 16 exposed, the consumer takes the lower shroud 14 in one hand and then frictionally engages the surface of the strike pad against the exposed ignition button on the gasser cartridge 18. This action is similar to that taken when lighting a match. The button immediately ignites and starts the countdown to actual ignition of the gas-forming composition in the gasser cartridge 18.

The steps of the method of use are further set forth in the flow chart of FIG. 3. The user first removes the cap from the gasser cartridge to reveal the strike pad in the shroud, step 100, and then removes the shroud on the gas cartridge by pulling the same straight up to expose the ignition button positioned on the cartridge, step 102. The user then takes the shroud in one hand and the cartridge in the other, step 104, and strikes the strike pad against the ignition button to ignite the button, step 106. With the button ignited, the user places the cartridge in a rodent burrow or other rodent lair, step 108, and then retreats a safe distance away from the location where the rodent gasser was placed before the gaseous or gas-forming composition in the cartridge ignites to produce a pest fumigating gas or smoke, step 110.

Figure 4:
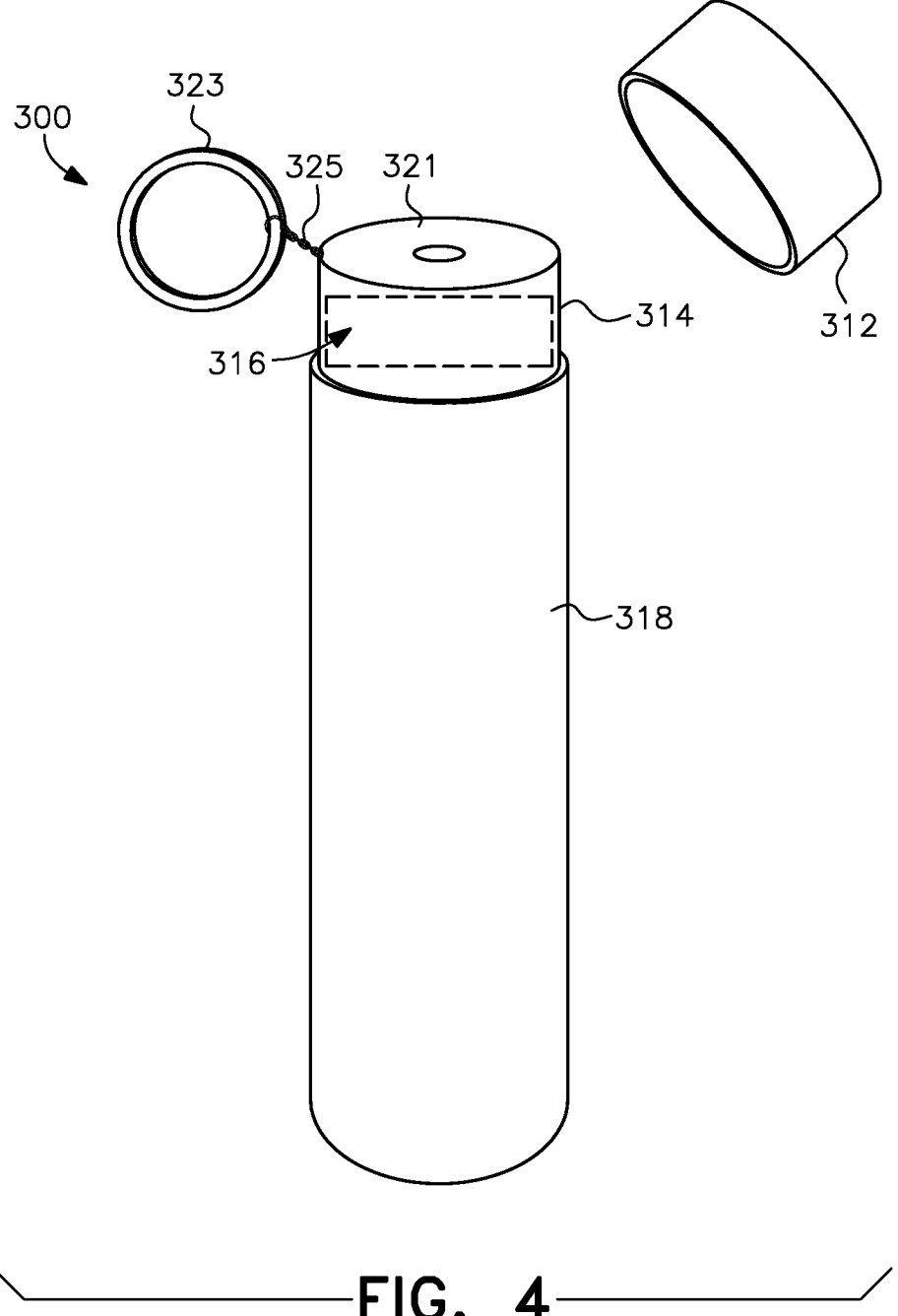
FIG. 4 is an exploded view of the components of a rodent gasser with an ignition system integrated into the gasser in accordance with a second embodiment of the present invention.
Figures 4A, 5:
FIG. 4A is a photograph of a rodent gasser like that depicted in FIG. 4.
FIG. 5 is a photograph showing an assembled view of the rodent gasser components shown in FIG. 4A.

According to a second embodiment as shown in the exploded view of FIGS. 4 and 4A and the assembled view of FIG. 5, the present invention is also directed to a rodent gasser generally designated by reference numeral 300. The rodent gasser 300 includes a top plastic cap 312 covering an integrated pull pin ignition assembly generally designated by reference numeral 316, and a gasser cartridge 318. The gasser cartridge 318 is preferably wrapped in paper, plastic or other suitable material. The top 321 of the gasser 300 may be sealed in plastic to protect the gasser from the elements.

Removal of the cap 312 reveals a gripping element here embodied as a finger ring 323. The finger ring 323 could be made of metal, plastic and the like, and other alternative embodiments could use a pull tab, a hooked element and the like. The gripping element is preferably coupled to a connecting element 325 that is attached to an ignition component, such as a firing pin structure, that is part of the integrated pull pin ignition system 316. The connecting element may be a twisted or untwisted wire, a chain, a cable, a string and the like. Alternatively, a separate gripping element could be eliminated provided the connecting element is configured with a grippable portion. In the embodiment shown, the finger ring 323 and connecting element 325 are covered by the cap 312 when the gasser is assembled as shown in FIG. 5.

In use of the rodent gasser according to the second embodiment, the consumer removes the cap 312, exposing the finger ring 323 and connecting element 325. To ignite the cartridge 318 the user pulls on the finger ring 323 which, through the connection of the connecting element 325, releases the firing pin (not shown) to ignite the gasser. The gasser may be provided with an internal fuse or other ignition element which is ignited by the action of pulling on the finger ring. Military use of pull pin technology for lighting grenades, pyrotechnics, demolitions and the like is described in the Army Field Manual 7-7, Appendix P, Section 5: Demolition. The M81 and M80 are military examples of fuse ignitors like those that may be used in the instant application.

The steps of the method of use according to the second embodiment are further set forth in the flow chart of FIG. 6. The user first removes the cap from the gasser cartridge to reveal the activation portion of the pull pin ignition system, step 400. The user then takes the gasser cartridge in one hand and grasps the finger ring using a finger on the other hand, step 402, and then pulls the finger ring to ignite the gasser, step 404. With the gasser ignited, the user places the cartridge in a rodent burrow or other rodent lair, step 406, and then retreats a safe distance away from the location where the rodent gasser was placed before the gaseous or gas-forming composition in the cartridge ignites to produce a pest fumigating gas or smoke, step 408.

According to both embodiments, the gas-forming material in the gasser cartridge may be made with a composition which is based on the oxidizer sodium nitrate or potassium nitrate such as the formulations listed as preferred embodiments in the first table on the following page. The composition can alternatively use both sodium nitrate and potassium nitrate. The gaseous or gas forming composition can contain a wide variety of ingredients the quantities of which those skilled in the art would know could be adjusted in order to provide differing performance attributes. Changes in composition may also be made to alter the cost, burn rate, smoke production, flame production, fuel/oxidizer ratio, ease of ignition, or molten byproducts of the rodent gasser, among other attributes. Without being limited thereby, a list of representative materials/components, with typical ranges, that the gaseous or gas forming composition may include is provided in the second table on the following page.

The rodent gasser product according to the present invention does not require a lighter, is wind proof, moisture proof, fully protected when not in use and simple to understand. The burn time of between about 15 seconds and about 60 seconds prior to ignition of the formula in the cartridge improves safety in use and the gasser lights virtually every time, providing much greater reliability than is possible with conventional fuse-lit gasser products.

What is claimed is:

1. A rodent gasser comprising:
a cartridge containing a gaseous composition for fumigating rodents, the composition including:
    30-60 wt % of at least one of potassium nitrate or sodium nitrate;
    6-30 wt % of carbon or charcoal;
    up to 20 wt % of calcium carbonate; and
    at least one of:
        less than 2 wt % dextrin;
        up to 10 wt % sawdust
        up to 20 wt % ground rock or minerals; and
        up to 20 wt % sugar;
a shroud removably attached to an end of the cartridge and including a strike pad having an exposed striking surface formed from a friction striking material, with the shroud attached to the end of the cartridge, the strike pad is arranged only on a side of the shroud opposite the cartridge with the striking surface facing away from the cartridge in an axial direction of the cartridge;
a cap removably attached to the side of the shroud opposite the cartridge and covering the strike pad with the cap fitted to the shroud, an exterior circumferential surface of the shroud positioned within the cap, the shroud has a larger outer diameter than an outer diameter of the cartridge; and
a self-ignition system for igniting the gaseous composition in the cartridge, the self-ignition system removably Preferred Embodiments

| Ingredient Name | % By Weight In Batch | Ingredient Name | % By Weight In Batch | Ingredient Name | % By Weight In Batch |
|---|---|---|---|---|---|
| Sodium Nitrate | 50.40% | Potassium Nitrate | 39.52% | Potassium Nitrate | 45.14% |
| Sulfur | 38.19% | Sulfur | 38.99% | Sulfur | 45.23% |
| Charcoal/Carbon | 9.00% | Charcoal/Carbon | 9.30% | Charcoal/Carbon | 8.00% |
| Mineral Oil | 2.41% | Calcium Carbonate | 9.19% | Dextrin | 1.63% |
| Total | 100.00% | Mineral Oil | 3.00% | Total | 100.00% |
| | | Total | 100.00% | | |

| Material/Component | Weight percentage of gaseous or gas forming composition |
|---|---|
| Potassium Nitrate and/or Sodium Nitrate | 30%-60% |
| Sulfur | 0%-50% |
| Carbon/Charcoal | 6%-30% |
| Paraffin Wax | 0%-5% |
| Oil (Paraffinic, Mineral, etc) | 0%-6% |
| Water | 0%-6% |
| Starch/Dextrins | 0%-10% |
| Polyvinyl Chloride | 0%-10% |
| Sawdust | 0%-10% |
| Ground Rock/Mineral such as Talcum Powder, Calcium Carbonate, Clay | 0%-20% |
| Sugar (sucrose, lactose, fructose, maltose, etc.) | 0%-20% |

The foregoing descriptions and drawings should be considered as illustrative only of the principles of the invention. The invention may be configured in a variety of shapes and sizes and is not limited by the dimensions of the preferred embodiments. Therefore, it is not desired to limit the invention to the specific examples disclosed. Rather, all suitable modifications and equivalents may be resorted to, falling within the scope of the invention.

attached to the shroud at the end of the cartridge and including an ignition surface facing away from the cartridge in the axial direction and adapted to be ignited by frictionally engaging with the striking surface, wherein the strike pad defines only a single exposed striking surface such that no portion of the striking surface of the strike pad faces the self-ignition system with the shroud attached to the end of the cartridge, and wherein the gasser is disposed in a first position with the cap and self-ignition system each attached to the shroud and movable into a second position with each of the cap and self-ignition system detached from the shroud to enable the frictional engagement of the self-ignition system and the striking surface of the strike pad, the self-ignition system includes a flammable ignition button that is covered by the shroud when the shroud is secured to the cartridge, the ignition button adapted to be ignited by frictionally engaging the ignition surface with the strike pad, the ignition button is arranged on a top surface of the cartridge and defines a major surface facing in the axial direction of the cartridge and adapted to be struck by the strike pad, the major surface of the ignition button to be struck by the strike pad is raised from the top surface of the cartridge and defines a circular shape concentric with a shape of the cartridge and has a diameter less than a diameter of the top surface of the cartridge.

2. The rodent gasser as set forth in claim 1, wherein the shroud is friction fit over an exterior circumferential surface of the cartridge, the shroud having a longer length than a length of the cap.

3. The rodent gasser as set forth in claim 1, wherein the striking surface of the strike pad faces away from the self-ignition system with the shroud attached to the end of the cartridge such that the shroud must be removed from and reoriented relative to the cartridge to strike the self-ignition system with the striking surface.

4. The rodent gasser as set forth in claim 1, wherein the composition includes less than 2 wt % dextrin.

5. The rodent gasser as set forth in claim 1, wherein the composition includes sawdust up to 10 wt %.

6. The rodent gasser as set forth in claim 1, wherein the composition includes ground rock or minerals up to 20 wt %.

7. The rodent gasser as set forth in claim 1, wherein the composition includes sugar up to 20 wt %.

8. The rodent gasser as set forth in claim 1, wherein the composition includes:

about 45 wt % potassium nitrate;
about 45 wt % sulfur;
about 8 wt % charcoal or carbon; and
about 1.6 wt % dextrin.

9. A rodent gasser comprising:

a cartridge containing a gaseous composition for fumigating rodents, the composition including 30-60 wt % of at least one of potassium nitrate or sodium nitrate, up to 20 wt % of calcium carbonate, up to 50 wt % of sulfur, and at least one:
of less than 2 wt % dextrin;
up to 10 wt % sawdust;
up to 20 wt % ground rock or minerals; and
up to 20 wt % sugar;
a shroud removably attached to an end of the cartridge and including a strike pad having a single exposed striking surface formed from a friction striking material, with the shroud attached to the cartridge, the striking surface faces away from the cartridge in an axial direction of the cartridge;
a cap removably attached to an end of the shroud opposite the cartridge, the striking surface facing toward the cap, an exterior circumferential surface of the shroud positioned within the cap, the shroud has a larger outer diameter than an outer diameter of the cartridge; and
a self-ignition system for igniting the gaseous composition in the cartridge, the self-ignition system removably attached to the shroud at the end of the cartridge and facing away from the cartridge in the axial direction, the self-ignition system completely covered by the cap with the cap attached to the end of the shroud and adapted to be ignited via frictional engagement with the striking surface of the strike pad, wherein no portion of the striking surface of the strike pad faces the self-ignition system with the shroud attached to the end of the cartridge, and wherein the gasser is disposed in a first position with the cap and self-ignition system each attached to the shroud and movable into a second position with each of the cap and self-ignition system detached from the shroud to enable the frictional engagement of the self-ignition system and the striking surface of the strike pad, the self-ignition system includes a flammable ignition button that is covered by the shroud when the shroud is secured to the cartridge, the ignition button adapted to be ignited by frictionally engaging the ignition surface with the strike pad, the ignition button is arranged on a top surface of the cartridge and defines a major surface facing in the axial direction of the cartridge and adapted to be struck by the strike pad, the major surface of the ignition button to be struck by the strike pad is raised from the top surface of the cartridge and defines a circular shape concentric with a shape of the cartridge and has a diameter less than a diameter of the top surface of the cartridge.

10. The rodent gasser as set forth in claim 9, wherein the gaseous composition cannot be ignited by the self-ignition system with the cap attached to the cartridge.

11. The rodent gasser as set forth in claim 9, wherein after being ignited, the self-ignition system has a delay of about 60 seconds before igniting the gaseous composition in the cartridge.

12. The rodent gasser as set forth in claim 9, wherein an end of the cartridge under the cap is sealed in plastic.

13. The rodent gasser as set forth in claim 9, wherein, with the shroud attached to the end of the cartridge, the shroud is arranged between and separates the strike pad and the self-ignition system and the striking surface of the strike pad faces away from the self-ignition system.

14. The rodent gasser as set forth in claim 9, wherein the shroud is friction fit over an exterior circumferential surface of the cartridge.

15. The rodent gasser as set forth in claim 9, wherein the striking surface of the strike pad faces away from the self-ignition system with the shroud attached to the end of the cartridge such that the shroud must be removed from and reoriented relative to the cartridge to strike the self-ignition system with the striking surface.

16. A rodent gasser, comprising:

a cartridge containing a gaseous composition for fumigating rodents, the composition including 30-60 wt % of at least one of potassium nitrate or sodium nitrate, up to 20 wt % of calcium carbonate, up to 50 wt % of sulfur, and at least one of:
less than 2 wt % dextrin;
sawdust up to 10 wt %;
ground rock or minerals up to 20 wt %; and
sugar up to 20 wt %;
a shroud removably attached to an end of the cartridge and including a strike pad having a striking surface, with the shroud attached to the end of the cartridge, the strike pad arranged on a side of the shroud opposite the cartridge with the striking surface formed from a striking material facing away from the cartridge in an axial direction of the cartridge;
a cap removably attached to the shroud opposite the cartridge and covering the strike pad with the cap fitted to the shroud, an exterior circumferential surface of the shroud positioned within the cap, the shroud has a larger outer diameter than an outer diameter of the cartridge; and
a self-ignition system for igniting the gaseous composition in the cartridge removably attached to the shroud at the end of the cartridge, wherein:
the shroud is arranged between and separates the strike pad and the self-ignition system with the shroud attached to the end of the cartridge;

no portion of the striking surface of the strike pad faces the self-ignition system with the shroud attached to the end of the cartridge;

the gasser is disposed in a first position with the cap and self-ignition system each attached to the shroud and movable into a second position with each of the cap and self-ignition system detached from the shroud to enable the frictional engagement of the self-ignition system and the striking surface of the strike pad, and the self-ignition system includes a flammable ignition button that is covered by the shroud when the shroud is secured to the cartridge, the ignition button adapted to be ignited by frictionally engaging the ignition surface with the strike pad, the ignition button is arranged on a top surface of the cartridge and defines a major surface facing in the axial direction of the cartridge and adapted to be struck by the strike pad, the major surface of the ignition button to be struck by the strike pad is raised from the top surface of the cartridge and defines a circular shape concentric with a shape of the cartridge and has a diameter less than a diameter of the top surface of the cartridge.

* * * * *